April 7, 1959 W. B. COUGHLIN 2,881,011
VALVE INSTALLATION AND ATTACHMENT
Filed June 30, 1954
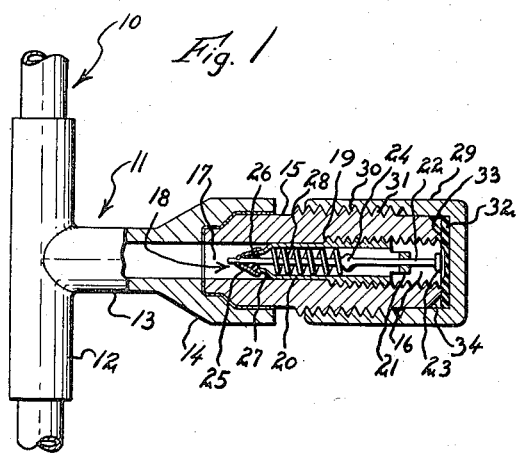
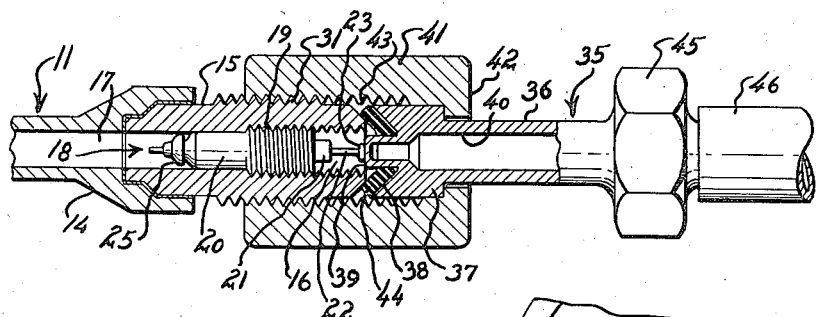
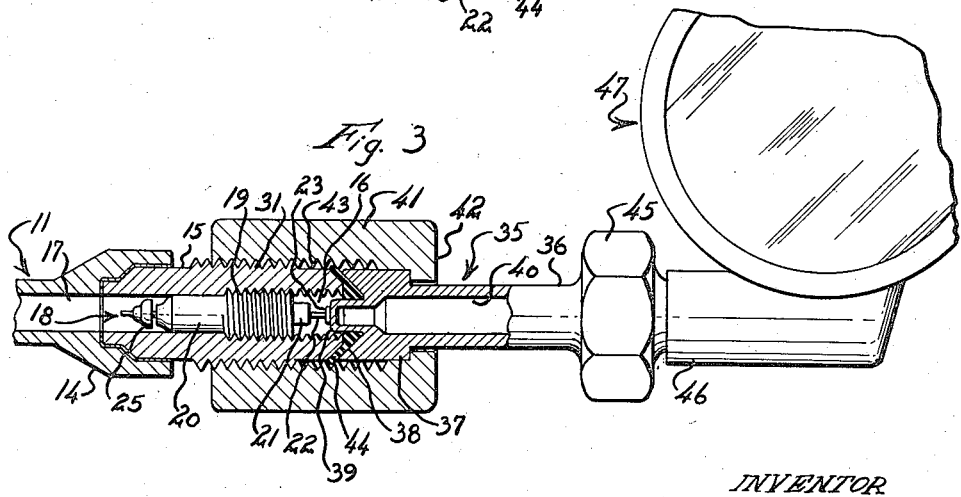
INVENTOR
WILLIAM B. COUGHLIN
BY Williamson, Williamson
Schroeder & Adams
ATTORNEYS United States Patent Office 2,881,011
Patented Apr. 7, 1959

2,881,011

VALVE INSTALLATION AND ATTACHMENT

William B. Coughlin, Northfield, Minn.

Application June 30, 1954, Serial No. 440,350

3 Claims. (Cl. 284—18)

This invention relates to a mechanism for installing in hermetically sealed relation and in connection with a fluid pressure line, and more particularly to a valve installation for permanent connection with a pressure fluid line which is adapted to have temporarily connected thereto from time to time an attachment.

In the pressure fluid lines of such apparatus as refrigerating equipment, it often becomes necessary in repairing and maintaining such equipment to effect a connection therewith to test the pressure of fluid and for other purposes such as bleeding off or replenishing fluid. In most cases it is necessary for the technician to break the line to make the connection with the sealed line. It then becomes necessary to remove the pressurized fluid such as ammonia, Freon or other gas and particular care must be exercised if the fluid is a toxic gas.

It is an important object of this invention to provide a valve installation, in cases where there is no provision for testing the pressure or other quality of pressurized fluid, so that attachments may be quickly and easily made therewith.

It is another object to provide mechanism normally sealed against communication with the atmosphere which will provide means for easily and quickly attaching such items as pressure indicators thereto without permitting escape of fluid during the attaching or detaching operations.

It is a further object of the invention to provide a valve device of the class described in which a protecting cap may be secured thereto and alternatively a fluid connection established by replacing said cap with a connector having a resilient seal for engaging a tubular end of the valve and further having an abutment for then actuating the valve to permit fluid communication through the sealed connection, the order of actuating and sealing being reversed when said connector is removed, thus preventing escape of fluid to the atmosphere at all times.

These and other objects and advantages of the invention will more fully appear from the following description made in connection with the accompanying drawings wherein like reference characters refer to similar parts throughout the several views, and in which:

Fig. 1 is a side view of my valve installation with the protective cap member secured thereto, the portion of the installation adjacent the valve structure being shown partially in vertical section;

Fig. 2 is a similar view to that shown in Fig. 1, the cap member having been replaced with an attachment member, unessential portions being cut away and the area adjacent the valve structure being shown in vertical section; the attachment member has been partially advanced to sealing relation but not yet to valve-releasing position; and Fig. 3 is a similar view to that shown in Fig. 2, the attaching device having been closed convergently to effect valve releasing in addition to sealing between the members.

Referring now more particularly to the drawings, my invention contemplates a fluid line 10 of the type which is employed in conveying fluid under pressure in such devices as refrigerating equipment and the like. The fluid line is shown in part in Fig. 1 and is generally indicated by the numeral 10. The fluid line 10 is severed or is provided during construction with my valve installation, the body fixture of which is indicated generally at 11. In most instances, the fixture comprises a tubular T member the straight arm 12 of which is adapted to be intercepted in the fluid line 10 and the side arm 13 of which is adapted to project laterally from fluid line 10. The side arm 13 may be of integral construction or may have a flared connection 14 which is adapted to be secured to the side arm extension 15 as shown in Fig. 1. The side arm terminates outwardly in an orifice 16 and mounted within the tubular passageway 17 is a valve member indicated generally at 18. The valve member is preferably inserted and held within tubular passageway 17 by a threaded connection 19.

The valve member 18 in turn comprises a tubular body 20 having the threaded connection 19 previously noted and being provided with a U-shaped guiding member 21 through which a valve stem 22 extends. The valve stem 22 has a forwardly extending abutment 23 which terminates adjacent the mouth of orifice 16 and also has an intermediate abutment 24 and a rearward abutment 25. The rearward abutment 25 has secured therewith a resilient seal 26 which is adapted to seat against the reduced tubular end 27 of body 20. A compression spring 28 is interposed between the reduced end 27 and the abutment 24 so as to normally maintain the resilient seal 26 in engagement with the reduced end 27. The tubular body 20 permits the passage of fluid therethrough from the sides of guiding member 21 through the annular opening surrounding the stem 22 at the reduced end portion 27.

When the valve installation is maintained in its normal condition without an attachment secured thereto, a protecting cap member 29 is secured therewith. The outer portion of the side arm extension is provided with a threaded connector 30 and the inner surface of cap 29 is provided with matching threads 31 as shown. A sealing ring 32 may be placed at the inside of cap 29 so as to engage the annular end 33 of the tubular side arm. The annular end 33 has a beveled edge 34 for a purpose about to be described.

Referring now to Figs. 2 and 3, the cap member 29 has been removed from the valve installation and an attachment indicated generally at 35 is secured thereto. The attachment 35 comprises in turn a tubular member 36 having a flared end portion 37 with a recessed conical face 38 as shown in Fig. 2. A U-shaped abutment 39 is formed across the conical portion 38 and overlies the tubular passageway 40 which terminates forwardly beneath the U-shaped abutment 39. A sheath connector 41 lies in sliding engagement with the tube 36 and has a reduced annular end 42 which is adapted to engage the shoulder enlarged portion 37 as shown in Fig 2. The threads 31 at the outside of the valve installation are adapted to engage the corresponding threads 43 which are formed at the inside of the sheath member 41. The conical surface 38 has a resilient annular sealing member 44 secured thereagainst for interposition between conical surface 38 and the beveled edge 34, as shown in Fig. 2.

The attachment member 35 may be provided with a hexagonal nut 45 and a tubular extension 46 which in turn is secured in fluid connection with a device such as the pressure gauge 47 shown in Fig. 3. The nut 45 may be employed to orient the dial of pressure gauge 47 for easy observation.

In the use and operation of my invention, the valve installation is mounted across the pressurized fluid line in an apparatus such as used for refrigerating, with the long arm 12 disposed lengthwise of the fluid line. The side arm 11 is provided with a valve structure as previously described and a cap 29 is normally maintained thereover with its seal 32 in engagement with the tubular end 33 as shown in Fig. 1. Whenever it is desired to place an attachment such as the fluid pressure gauge 47 in fluid communication with fluid line 10, the cap 29 is removed from the side arm structure and the open end or orifice 16 is thus exposed. The connector or sheath member 41 is then brought to the threaded end of side arm 11 and is rotated by hand so as to cause converging of the attachment tube 36 and the tubular side arm 15. As the members are drawn together, the sealing ring 44 will be seated between the conical face 38 and the beveled portion 34 to effect a fluid-tight relationship between the attachment and the valve installation. The resilient seal 44 is of such a nature and is angulated in such a manner as to permit considerable additional advancing or converging of the tubular members. Thus, continued rotation of the sheath connector 41 will compress the sealing ring 44 to the point where the abutment or bracket 21 will engage the stem abutment 23 and cause it to be depressed from the position shown in Fig. 2 to the position illustrated in Fig. 3. It will be noted that the sealing ring 44 is further compressed so as to maintain the seal between the tubular members but now the valve stem 22 has been depressed so as to unseat the resilient seal 26 and permit fluid communication between passageway 17 and passageway 40. The pressure gauge 47 is then placed in direct communication with pressure fluid line 10 without the loss of any fluid to the atmosphere. When it is desired to remove the attachment, the reverse procedure is employed, rotating the sheath connector 41 in the opposite direction. The resilient seal 26 will then be permitted to seat itself upon divergents of the bracket abutment 39 with respect to the valve stem abutment 23. The communication between the attachment and the fluid line 10 will then be sealed before the sealing engagement of the tubular members 36 and 11 has been interrupted. Upon continued rotation of the sheath connector 41, the seal 44 will be withdrawn from the beveled edge 34 and the entire attachment removed, leaving the valve in closed position. Cap member 29 may then be returned to the valve installation for protecting the threads and further sealing the orifice 16 until such time as it is again desired to secure the attachment thereto.

It may thus be seen that I have devised a simple and efficient valve mechanism which will form a permanent part of a pressure fluid line and which can be readily adapted for securing to an attachment such as a pressure gauge without loss of fluid from the line, either during the attachment or removal of the device.

It will of course be understood that various changes may be made in the form, details, arrangement and proportions of the various parts without department from the scope of my invention.

What is claimed is:

1. A device for connection with a pressurized fluid line comprising, a fixture having a tubular inlet for securing in sealed relation with said pressurized fluid line and a tubular side member terminating at its outer end in an orifice, a valve mounted within the side member capable of preventing or permitting the flow of pressurized fluid through the device, said valve having an abutment lying within said side member and terminating adjacent said orifice, an attachment such as a pressure gauge for communication with said fluid line, a resilient annular seal interposed between the attachment and the orifice of the side member, convergent securing means on said tubular side member, cooperative securing means for convergently connecting the attachment to said side member, said attachment first engaging in sealing arrangement with the resilient seal and then in converging valve-releasing engagement with said abutment for establishing a temporary fluid connection between said fluid line and said attachment without loss of fluid, said resilient seal being further compressed to maintain its seal during valve release.

2. A device for connection with a pressurized fluid line comprising, a tubular T member mountable across said pressurized fluid line in sealed relation therewith, the side arm of said tubular T terminating in an open end, a spring-pressed valve mounted within said side arm and normally urged outwardly against a valve seat into sealing engagement for preventing the escape of fluid through said side arm movable inwardly against pressure to release and unseat the valve from the valve seat thereby permitting the flow of fluid through said side arm, an attachment device such as a pressure indicator having a tubular end, convergent securing means for attaching the tubular end of said attachment to said side arm, an abutment within said tubular end of the attachment, and a resilient seal annularly disposed between said attachment and said side arm whereby, upon convergently securing the attachment to said side arm, a sealing engagement will first be effected and then the abutment of the attachment device will engage the spring-pressed valve to release fluid from the fluid line into said attachment while maintaining said sealing engagement, said resilient seal lying in compressed condition when said valve is unseated.

3. A device for connection with a pressurized fluid line comprising, a fixture having a tubular inlet for securing in sealed relation with said pressurized fluid line and a tubular side member terminating at its outer end in an orifice, a valve mounted within the side member capable of preventing or permitting the flow of pressurized fluid through the device, said side member having a beveled seat around said orfice and said valve having a longitudinally extending abutment lying within said side member and terminating adjacent said orifice, an attachment having a tubular inlet and terminating forwardly in an annular beveled seat adapted to mate with that of said side member and further having an abutment extending forwardly of the attachment inlet for engagement with the valve abutment when in mounted relation, a resilient annular seal interposed in compressed form between the said respective beveled seats, and convergent securing means for holding said attachment in firm fluid communication through said valve, said attachment abutment being located in such relative relation to the valve abutment as upon diverging movement to first close said valve while permitting the seal to expand and then release the sealed engagement between the resilient seal and beveled seats and upon converging during during securing of the attachment to the side member, to first effect sealing contact between the resilient seal and the opposed seats then on further converging movement to bring the seal back to its compressed form and to effect opening of the valve through movement of the respective abutments, while in contact.

References Cited in the file of this patent

UNITED STATES PATENTS

| 695,767   | Steitz          | Mar. 18, 1902 |
| 1,312,457 | Schweinert et al. | Aug. 5, 1919 |
| 2,099,490 | Larsson         | Nov. 16, 1937 |
| 2,135,222 | Scheiwer        | Nov. 1, 1938 |
| 2,305,841 | Carlson         | Dec. 22, 1942 |
| 2,322,877 | Parker          | June 29, 1943 |
| 2,434,167 | Knoblauch       | Jan. 6, 1948 |

FOREIGN PATENTS

| 657,381 | Great Britain | Sept. 19, 1951 |